US008560708B2

(12) United States Patent
Nelakonda et al.

(10) Patent No.: US 8,560,708 B2
(45) Date of Patent: Oct. 15, 2013

(54) METHOD AND APPARATUS FOR ALLOCATING BUNDLES OF SESSIONS IN A NETWORK ELEMENT

(75) Inventors: Sathyender Nelakonda, Saratoga, CA (US); Suresh Kannan Durai Samy, Sunnyvale, CA (US); Himanshu Shah, Milpitas, CA (US); Satyam Sinha, Sunnyvale, CA (US); Praveen Muley, Mountain View, CA (US); Prasad Chigurupati, Cupertino, CA (US); Vachaspathi Peter Kompella, Cupertino, CA (US); Joseph Regan, Auburn, CA (US)

(73) Assignee: Alcatel Lucent, Paris (FR)

( * ) Notice: Subject to any disclaimer, the term of this patent is extended or adjusted under 35 U.S.C. 154(b) by 198 days.

(21) Appl. No.: 13/109,611

(22) Filed: May 17, 2011

(65) Prior Publication Data
US 2011/0320608 A1     Dec. 29, 2011

Related U.S. Application Data

(60) Provisional application No. 61/359,658, filed on Jun. 29, 2010.

(51) Int. Cl.
*G06F 15/16*     (2006.01)
(52) U.S. Cl.
USPC ............ 709/228; 709/226; 709/227; 709/206
(58) Field of Classification Search
USPC ................... 709/226, 227, 201–203, 223–22, 709/230–236; 370/328, 395.31, 466, 401, 370/252, 395.6
See application file for complete search history.

(56) References Cited

U.S. PATENT DOCUMENTS

| 6,901,079 B1 * | 5/2005 | Phadnis et al. ................. 370/466 |
| 2005/0190694 A1 * | 9/2005 | Ben-Nun et al. .............. 370/229 |
| 2006/0062225 A1 | 3/2006 | Li |

(Continued)

FOREIGN PATENT DOCUMENTS

| WO | WO 2007/130281 A2 | 11/2007 |
| WO | WO 2008/021360 A2 | 2/2008 |

OTHER PUBLICATIONS

The International Search Report and the Written Opinion of the International Searching Authority, or the Declaration, mailed Mar. 5, 2013, in PCT/US2011/041873, Alcatel Lucent, Applicant, 11 pages.

*Primary Examiner* — Hassan Kizou
*Assistant Examiner* — Gustavo Lopez-Vargas
(74) *Attorney, Agent, or Firm* — Wall & Tong, LLP (57) ABSTRACT

A session bundle allocation capability enables dynamic allocation of bundles of sessions being handled by a network element to modules of the network element (e.g., modules such as processing modules configured to perform one or more of traffic processing, traffic switching, and like functions). A bundle of sessions may be allocated by associating a plurality of sessions to form thereby a bundle of sessions, and assigning the bundle of sessions to a processing module group including one or more processing modules configured for processing traffic for the sessions of the bundle of sessions. A bundle of sessions may have a bundle identifier associated therewith and may be migrated from a first processing module group to a second processing module group by changing a mapping of the bundle identifier from being associated with the first processing module group to being associated with the second processing module group.

22 Claims, 5 Drawing Sheets

(56) References Cited

U.S. PATENT DOCUMENTS

| | | | |
|---|---|---|---|
| 2007/0223490 A1* | 9/2007 | Mizutani et al. | 370/395.6 |
| 2009/0010271 A1* | 1/2009 | Bachmann et al. | 370/401 |
| 2009/0213799 A1* | 8/2009 | Yeo et al. | 370/328 |
| 2009/0219861 A1* | 9/2009 | Higuchi et al. | 370/328 |
| 2010/0080133 A1* | 4/2010 | Oron | 370/252 |
| 2011/0003585 A1* | 1/2011 | Wang et al. | 455/418 |
| 2011/0032899 A1* | 2/2011 | Park et al. | 370/329 |
| 2011/0149872 A1* | 6/2011 | Carroll | 370/328 |
| 2011/0153764 A1* | 6/2011 | Li et al. | 709/206 |
| 2011/0255510 A1* | 10/2011 | Rydnell et al. | 370/331 |
| 2012/0110193 A1* | 5/2012 | Zhou et al. | 709/227 |

\* cited by examiner

METHOD AND APPARATUS FOR ALLOCATING BUNDLES OF SESSIONS IN A NETWORK ELEMENT

CROSS REFERENCE TO RELATED APPLICATION

This application claims the benefit of U.S. Provisional Patent Application Ser. No. 61/359,658, filed Jun. 29, 2010, which is incorporated herein by reference in its entirety.

TECHNICAL FIELD

The invention relates generally to communication networks and, more specifically but not exclusively, to enabling allocation of sessions in a network element.

BACKGROUND

In a Long Term Evolution (LTE) network, one or more service routers, implementing Packet Data Network (PDN) Gateway (PGW) and/or Serving Gateway (SGW) functions, is typically employed for handling traffic within the LTE network. In general, such a service router typically includes multiple processing/switching elements (e.g., mobile service modules (MSMs) for handling such traffic.

SUMMARY

Various deficiencies in the prior art are addressed by embodiments for allocating bundles of sessions within a network element.

In one embodiment, an apparatus includes a processor configured to associate a plurality of sessions to form thereby a bundle of sessions having a bundle identifier associated therewith, assign the bundle of sessions to a processing module group including one or more processing modules configured for processing communications traffic for the sessions of the bundle of sessions, and, in response to a session request of a user device, allocate a user device identifier for the user device using the bundle identifier and allocate a session identifier for the requested session using the user device identifier.

In one embodiment, a computer-readable storage medium stores instructions which, when executed by a processor, cause the processor to perform a method which includes associating a plurality of sessions to form a bundle of sessions having a bundle identifier associated therewith, assigning the bundle of sessions to a processing module group including one or more processing modules configured for processing communications traffic for the sessions in the bundle, and in response to a session request of a user device, allocating a user device identifier for the user device using the bundle identifier and allocating a session identifier for the requested session using the user device identifier.

In one embodiment, a method includes associating a plurality of sessions to form thereby a bundle of sessions having a bundle identifier associated therewith, assigning the bundle of sessions to a processing module group including one or more processing modules configured for processing communications traffic for the sessions of the bundle of sessions, and in response to a session request of a user device, allocating a user device identifier for the user device using the bundle identifier and allocating a session identifier for the requested session using the user device identifier.

In one embodiment, an apparatus includes a processor configured to forward a packet. The processor is configured to receive a packet associated with a session and including an identifier, where a portion of the identifier is a bundle identifier associated with a bundle of sessions, and where the bundle of sessions includes the session of the received packet. The processor is configured to select one of a plurality of processing module groups based on a mapping of the bundle identifier to the selected one of the processing module groups, where the processing module group includes one or more processing modules configured for processing the packet. The processor is configured to forward the packet toward a processing module of the selected one of the processing module groups.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

A session bundle allocation capability is depicted and described herein. The session bundle allocation capability enables dynamic allocation of bundles of sessions being handled by a network element to modules of the network element (e.g., modules such as processing modules configured to perform one or more of traffic processing, traffic switching, and like traffic-handling functions).

Although primarily depicted and described herein with respect to embodiments in which the session bundle allocation capability is provided within a service router providing a mobile gateway (e.g., one or more of Serving Gateway (SGW), Packet Data Network (PDN) Gateway (PGW), and Gateway GPRS Support Node (GGSN) capabilities), it will be appreciated that the session bundle allocation capability may be adapted for use in various other types of network elements (e.g., other types of routing devices, various types of switching devices, and the like, as well as various combinations thereof).

Although primarily depicted and described herein with respect to embodiments in which the session bundle allocation capability logically allocates bundles of sessions to specific types of traffic handling elements of network elements (e.g., processing modules, switching modules, and the like), it will be appreciated that session bundle allocation capability may be utilized for logically allocating bundles of sessions to any other suitable types of elements or modules of any suitable types of network elements.

Although primarily depicted and described herein with respect to embodiments in which the session bundle allocation capability is provided within an LTE network, it will be appreciated that the session bundle allocation capability may be provided within various other types of networks in which it may be necessary or desirable to logically allocate bundles of sessions to elements or modules of network elements.

Figure 1:
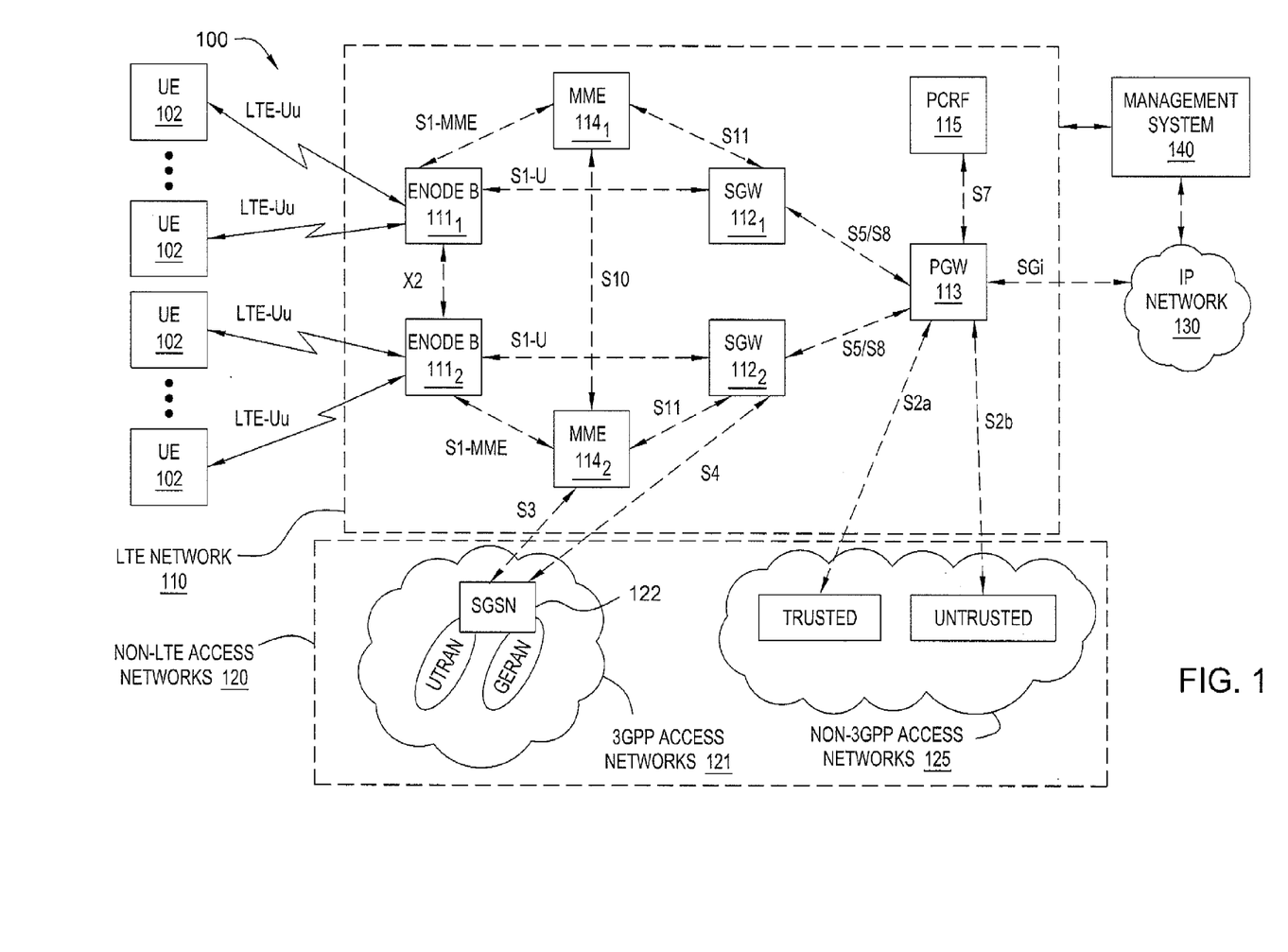
FIG. 1 depicts an exemplary wireless communication system including a management system for managing a wireless communication network.

FIG. 1 depicts an exemplary wireless communication system including a management system for managing a wireless network. Specifically, FIG. 1 depicts an exemplary wireless communication system 100 that includes a plurality of User Equipments (UEs) or User Devices (UDs) 102, a Long Term Evolution (LTE) network 110, non-LTE access networks 120, IP networks 130, and a management system (MS) 140. The LTE network 110 supports communications between the UEs 102 and IP networks 130. The non-LTE access networks 120 interface with LTE network 110 for enabling UEs associated with non-LTE access networks 120 to utilize the LTE network 110 to access IP networks 130. The MS 140 is configured for supporting various management functions for LTE network 110.

The UEs 102 are wireless user devices capable of accessing a wireless network, such as LTE network 110. The UEs 102 are capable of supporting one or more bearers/sessions to IP networks 130 via LTE network 110. The UEs 102 are capable of supporting control signaling to establish/maintain/destroy the bearers/sessions. The UEs 102 each may have one or more identifiers associated therewith. For example, a UE 102 may have one or more of an International Mobile Subscriber Identity (IMSI), an International Mobile Equipment Identity (IMEI), and like identifiers or identities associated therewith. For example, each of the UEs 102 may be a phone, PDA, computer, or any other wireless user device. Multiple UEs 102 are typically active at all times for each eNodeB.

The LTE network 110 is an exemplary LTE network. The configuration and operation of LTE networks will be understood by one skilled in the art. However, for purposes of completeness, a description of general features of LTE networks is provided herein within the context of exemplary wireless communication system 100.

The LTE network 110 includes two eNodeBs $111_1$ and $111_2$ (collectively, eNodeBs 111), two Serving Gateways (SGWs) $112_1$ and $112_2$ (collectively, SGWs 112), a Packet Data Network (PDN) Gateway (PGW) 113, two Mobility Management Entities (MMEs) $114_1$ and $114_2$ (collectively, MMEs 114), and a Policy and Charging Rules Function (PCRF) 115. The eNodeBs 111 provide a radio access interface for UEs 102. The SGWs 112, PGW 113, MMEs 114, and PCRF 115, as well as other components which have been omitted for purposes of clarity, cooperate to provide an Evolved Packet Core (EPC) network supporting end-to-end service delivery using IP.

The eNodeBs 111 support communications for UEs 102. As depicted in FIG. 1, each eNodeB 111 supports a respective plurality of UEs 102. The communication between the eNodeBs 111 and the UEs 102 is supported using LTE-Uu interfaces associated with each of the UEs 102. The eNodeBs 111 may support any functions suitable for being supported by an eNodeB, such as providing an LTE air interface for the UEs 102, performing radio resource management, facilitating communications between UEs 102 and SGWs 112, maintaining mappings between the LTE-Uu interfaces and S1-u interfaces supported between the eNodeBs 111 and the SGWs 112, and the like, as well as combinations thereof.

The SGWs 112 support communications for eNodeBs 111. As depicted in FIG. 1, SGW $112_1$ supports communications for eNodeB $111_1$ and SGW $112_2$ supports communications for eNodeB $111_2$. The communication between the SGWs 112 and the eNodeBs 111 is supported using respective S1-u interfaces. The S1-u interfaces support per-bearer user plane tunneling and inter-eNodeB path switching during handover. The S1-u interfaces may use any suitable protocol, e.g., the GPRS Tunneling Protocol-User Place (GTP-U). The SGWs 112 may support any functions suitable for being supported by an SGW, such as routing and forwarding user data packets (e.g., facilitating communications between eNodeBs 111 and PGW 113, maintaining mappings between the S1-u interfaces and S5/S8 interfaces supported between the SGWs 112 and PGWs 113, and the like), functioning as a mobility anchor for UEs during inter-eNodeB handovers, functioning as a mobility anchor between LTE and other 3GPP technologies, and the like, as well as combinations thereof.

The PGW 113 supports communications for the SGWs 112. The communication between PGW 113 and SGWs 112 is supported using respective S5/S8 interfaces. The S5 interfaces provide functions such as user plane tunneling and tunnel management for communications between PGW 113 and SGWs 112, SGW relocation due to UE mobility, and the like. The S8 interfaces, which are Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The S5/S8 interfaces may utilize any suitable protocol (e.g., the GPRS Tunneling Protocol (GTP), Mobile Proxy IP (MPIP), and the like, as well as combinations thereof). The PGW 113 facilitates communications between LTE network 110 and IP networks 130 via an SGi interface. The PGW 113 may support any functions suitable for being supported by an PGW, such as providing packet filtering, providing policy enforcement, functioning as a mobility anchor between 3GPP and non-3GPP technologies, and the like, as well as combinations thereof.

The MMEs 114 provide mobility management functions in support of mobility of UEs 102. The MMEs 114 support the eNodeBs 111. The MME $114_1$ supports eNodeB $111_1$ and the MME $114_2$ supports eNodeB $111_2$. The communication between MMEs 114 and eNodeBs 111 is supported using respective S1-MME interfaces, which provide control plane protocols for communication between the MMEs 114 and the eNodeBs 111. The S1-MME interfaces may use any suitable protocol or combination of protocol. For example, the S1-MME interfaces may use the Radio Access Network Application Part (eRANAP) protocol while using the Stream Control Transmission Protocol (SCTP) for transport. The MMEs 114 support the SGW 112. The MME $114_1$ supports SGW $112_1$ and the MME $114_2$ supports SGW $112_2$. The communication between MMEs 114 and SGWs 112 is supported using respective 511 interfaces. The MMEs $114_1$ and $114_2$ communicate using an S10 interface. The MMEs 114 may support any functions suitable for being supported by a MME, such selecting SGWs for UEs at time of initial attachment by the UEs and at time of intra-LTE handovers, providing idle-mode UE tracking and paging procedures, bearer activation/deactivation processes, providing support for Non-Access Stratum (NAS) signaling (e.g., terminating NAS signaling, ciphering/integrity protection for NAS signaling, and the like), lawful interception of signaling, and the like, as well as combinations thereof. The MMEs 114 also may communicate with a Home Subscriber Server (HSS) using an S6a interface for authenticating users (the HSS and the associated S6a interface are omitted for purposes of clarity).

The PCRF 115 provides dynamic management capabilities by which the service provider may manage rules related to services provided via LTE network 110 and rules related to charging for services provided via LTE network 110. For example, rules related to services provided via LTE network 110 may include rules for bearer control (e.g., controlling acceptance, rejection, and termination of bearers, controlling QoS for bearers, and the like), service flow control (e.g., controlling acceptance, rejection, and termination of service flows, controlling QoS for service flows, and the like), and the like, as well as combinations thereof. For example, rules related to charging for services provided via LTE network 110 may include rules related to online charging (e.g., time-based charging, volume-based charging, event-based charging, and the like, which may depend on factors such as the type of service for which charging is being provided), offline charging (e.g., such as for checking subscriber balances before services are provided and other associated functions), and the like, as well as combinations thereof. The PCRF 115 communicates with PGW 113 using a S7 interface. The S7 interface supports transfer of rules from PCRF 115 to a Policy and Charging Enforcement Function (PCEF) supported by PGW 113, which provides enforcement of the policy and charging rules specified on PCRF 115.

As depicted in FIG. 1, elements of LTE network 110 communicate via interfaces between the elements. The interfaces described with respect to LTE network 110 also may be referred to as sessions. For example, the communication between eNodeBs and SGWs is provided via S1-u sessions, communication between SGWs and PGWs is provided via S5/S8 sessions, and so forth, as depicted in FIG. 1 and described herein. The sessions of LTE network 110 may be referred to more generally as S* sessions. It will be appreciated that each session S* that is depicted in FIG. 1 represents a communication path between the respective network elements connected by the session and, thus, that any suitable underlying communication capabilities may be used to support the session S* between the network elements. For example, a session S* may be supported using anything from direct hardwired connections to full network connectivity (e.g., where the session S* is transported via one or more networks utilizing nodes, links, protocols, and any other communications capabilities for supporting the communication path) and anything in between, or any other suitable communications capabilities.

For example, an S1-u session between an eNodeB 111 and an SGW 112 may be supported using an Internet Protocol (IP)/Multiprotocol Label Switching (MPLS) transport capability including mobile backhaul elements associated with the eNodeB 111 (e.g., using service aware routers (SARs), service access switches (SAS), and the like) and mobile backhaul elements associated with the SGW 112 (e.g., multi-service edge routers and/or other similar elements), as well as an IP/MPLS aggregation network facilitating communications between the mobile backhaul elements associated with the eNodeB 111 and the mobile backhaul elements associated with the SGW 112). Similarly, an S1-u session between an eNodeB 111 and an SGW 112 may be supported using an IP routing network using a routing protocol (e.g., Open Shortest Path First (OSPF), Intermediate System to Intermediate System (ISIS) and the like). The types of underlying communications capabilities which may be utilized to support each of the different types of sessions of LTE network 110 will be understood by one skilled in the art.

The LTE network 110 supports access to IP networks 130 from non-LTE networks 120.

The non-LTE networks 120 with which the LTE network 110 may interface include 3GPP access networks 121. The 3GPP access networks 121 may include any 3GPP access networks suitable for interfacing with LTE network 110 (e.g., 2.5G networks, 3G networks, 3.5G networks, and the like). For example, the 3GPP access networks 121 may include Global System for Mobile (GSM) Enhanced Data Rates for GSM Evolution (EDGE) Radio Access Networks (GERANs), Universal Mobile Telecommunications System (UMTS) Terrestrial Radio Access Networks (UTRANs), or any other 3GPP access networks suitable for interfacing with LTE, and the like, as well as combinations thereof.

The LTE network 110 interfaces with 3GPP access networks 121 via a Serving General Packet Radio Service (GPRS) Support Node (SGSN) 122. The MME 114$_2$ supports control plane functionality for mobility between LTE network 110 and 3GPP access networks 121 using communication with SGSN 122 via an S3 interface. For example, the S3 interface enables user and bearer information exchange for 3GPP network access mobility in idle and/or active state. The SGW 112$_2$ supports user plane functionality for mobility between LTE network 110 and 3GPP access networks 121 using communication with SGSN 122 via an S4 interface. For example, the S4 interface provides the user plane with related control and mobility support between SGSN 122 and SGW 112$_2$.

The non-LTE networks with which the LTE network may interface include non-3GPP access networks 125. The non-3GPP access networks 125 may include any non-3GPP access networks suitable for interfacing with LTE network 110. For example, the non-3GPP access networks may include 3GPP2 access networks (e.g., Code Division Multiple Access 2000 (CDMA 2000) networks and other 3GPP2 access networks), Wireless Local Area Networks (WLANs), and the like. The support for mobility between the LTE network 110 and the non-3GPP access networks 125 may be provided using any suitable interface(s), such as one or more of the S2a interface, the S2b interface, the S2c interface, and the like, as well as combinations thereof. The S2a interface provides control and mobility support to the user plane for trusted non-3GPP access to the LTE network. The S2a interface may provide access for trusted non-3GPP networks using any suitable protocol(s), such as MPIP, Client Mobile IPv4 Foreign Agent (FA) mode (e.g., for trusted non-3GPP access that does not support MPIP), and the like, as well as combinations thereof. The S2b interface provides control and mobility support to the user plane for non-trusted non-3GPP access to the LTE network. The S2b interface may be provided an interface between PGW 113 and an evolved Packet Data Gateway (ePDG) associated with the non-trusted non-3GPP access network. The S2b interface may use any suitable protocol, such as MPIP or any other suitable protocols. The S2c interface provides control and mobility support to the user plane for providing UEs access to PGW 113 via trusted and/or non-trusted 3GPP access using one or more protocols based on Client Mobile IP co-located mode.

The LTE network 110 includes an Evolved Packet System/Solution (EPS). In one embodiment, the EPS includes EPS nodes (e.g., eNodeBs 111, SGWs 112, PGW 113, MMEs 114, and PCRF 115) and EPS-related interconnectivity (e.g., the S* interfaces, the G* interfaces, and the like). The EPS-related interfaces may be referred to herein as EPS-related paths.

The IP networks 130 include one or more packet data networks via which UEs 102 may access content, services, and the like. For example, the IP networks 130 include an IP Core network and, optionally, one or more other IP networks (e.g., IP Multimedia Subsystem (IMS) networks and the like). The IP networks 130 support bearer and control functions in support of services provided to UEs 102 via LTE network 110. The IP Core network is capable of providing any functions which may be provided by such a core network. The IP Core network is a packet data network via which UEs 102 may access content, services, and the like.

The IMS network is capable of providing any functions which may be provided by an IMS network.

The MS 140 provides management functions for managing the LTE network 110. The MS 140 may communicate with LTE network 110 in any suitable manner. In one embodiment, for example, MS 140 may communicate with LTE network 110 via a communication path 141 which does not traverse IP network networks 130. In one embodiment, for example, MS 140 may communicate with LTE network 110 via a communication path 142 which via IP network networks 130. The communication paths 141 and 142 may be implemented using any suitable communications capabilities. An exemplary management system suitable for use as MS 140 of FIG. 1 is depicted and described with respect to FIG. 2.

As depicted and described herein, the communication system 100 is merely exemplary. It will be appreciated that, although depicted and described herein with respect to specific numbers and arrangements of eNodeBs 111, SGWs 112, PGW 113, MMEs 114, and PCRF 115, an LTE wireless network may be implemented using different numbers and/or arrangements of eNodeBs 111, SGWs 112, PGW 113, MMEs 114, and PCRF 115. For example, LTE networks are typically implemented hierarchically, such as where the LTE network includes one or more PGWs, each of the PGWs supports respective pluralities of SGWs, and each of the SGWs supports respective pluralities of eNodeBs. It will be further appreciated that, although depicted and described herein with respect to an LTE wireless network that supports specific types of interfaces (namely, the S* interfaces, as well as other non-S interfaces), many other types of interfaces may be supported between elements of an LTE wireless network and/or between components of an LTE wireless network and components of non-LTE wireless networks. As such, management functions depicted and described herein are not limited to use in any particular configuration of an LTE wireless network.

Figure 2:
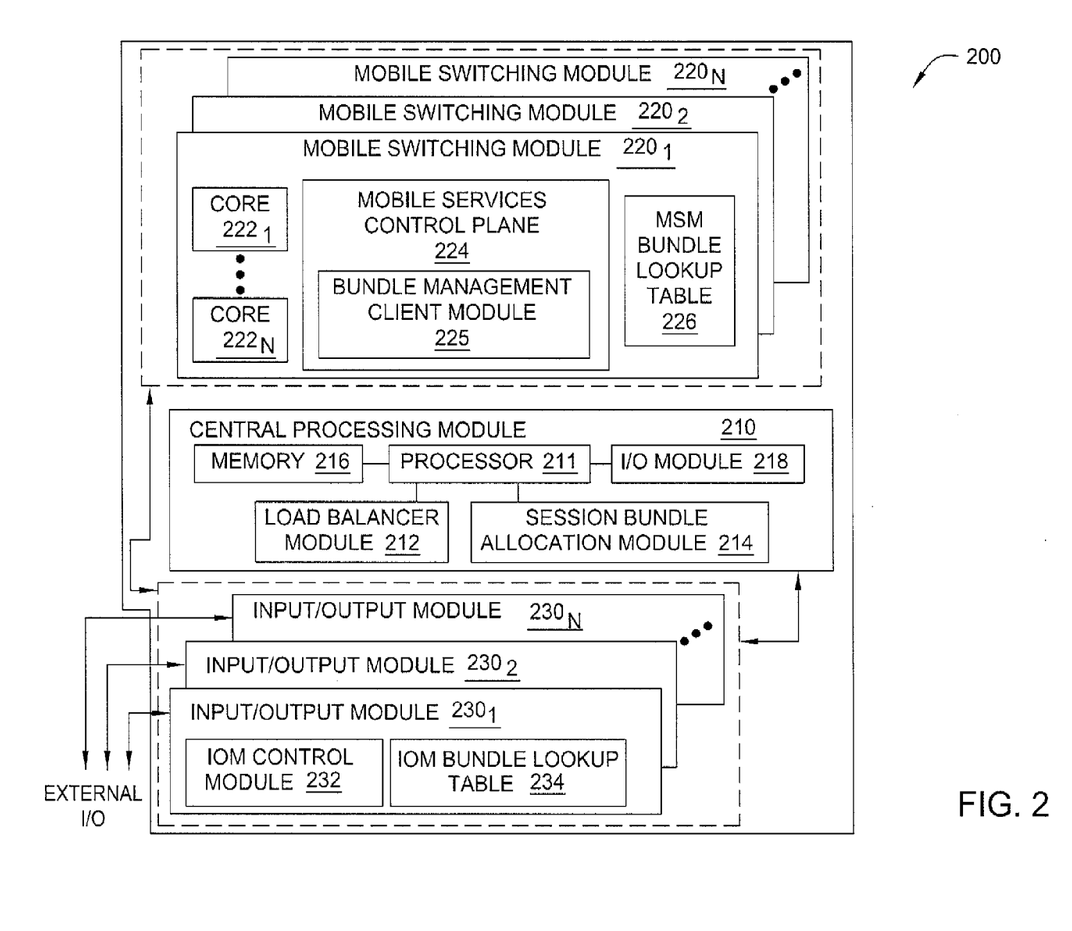
FIG. 2 depicts a high-level block diagram of a system including an exemplary router supporting a mobile gateway implementation.

FIG. 2 depicts a high-level block diagram of an exemplary network element configured to support a session bundle allocation capability.

The exemplary network element 200 supports mobile gateway capabilities, which may include one or more of a Serving Gateway (SGW) function, a Packet Data Network (PDN) Gateway (PGW) function, Gateway GPRS Support Node (GGSN) function, and like functions which may be supported by routers within 3G Long Term Evolution (LTE) networks, 4G networks, and other types of networks.

The exemplary network element 200 includes a central processing module (CPM) 210, a plurality of input/output modules (IOMs) 220₁-220$_M$ (collectively, IOMs 220), and a plurality of mobile switching modules (MSMs) 230₁-230$_N$ (collectively, MSMs 230). The CPM 210 communicates with the IOMs 220 and the MSMs 230, and the IOMs 220 and MSMs 230 communicate with each other (e.g., directly and/or via CPM 210).

The CPM 210 is configured to perform various processing functions for exemplary network element 200, including various functions associated with providing the session bundle allocation capability. The CPM 210 includes a processor 211. The CPM 210 includes a load balancer module (LBM) 212 configured for distributing load associated with routing of traffic via exemplary network element 200 across the MSMs 220. The CPM 210 includes a session bundle allocation module (SBAM) 214 configured for providing various functions in support of the session bundle allocation capability. The CPM 210 includes a memory 126 configured for storing various types of information (e.g., programs, data, and the like). The CPM 210 includes an input/output (I/O) module 218 configured for enabling the CPM 210 to interface with other elements of exemplary network element 200 (e.g., IOMs 220, MSMs 230, and the like). The load balancing and session bundle allocation functions of LBM 212 and SBAM 214, respectively, may be provided by CPM 210 in any suitable manner. In one embodiment, for example, LBM 212 and SBAM 214 may be implemented as modules that cooperate with processor 211 to provide their respective functions. In one embodiment, for example, LBM 212 and SBAM 214 may represent respective programs which may be stored in memory 216 and executed by processor 211 for providing their respective functions. Various combinations of such embodiments also may be used. The load balancing and/or session bundle allocation functions may be provided in any other suitable manner.

The MSMs 220 are configured to provide various processing functions for traffic routed via exemplary network element 200. The MSMs 220 each include a plurality of processing entities or cores 222₁-222$_N$ (collectively, cores 222), although it will be appreciated that one or more of the MSMs 220 may include only a single core 222. The MSMs 220 also each include a Mobile Services Control Plane (MSCP) 224 including a Bundle Management Client Module (BMCM) 225. The MSMs 220 also each include an MSM bundle lookup table (MBLT) 226.

The IOMs 230 are configured to operate as ingress and/or egress points to and/or from exemplary network element 200. The IOMs 230 each include an IOM Control Module 232 and an IOM bundle lookup table (IBLT) 234.

Although primarily depicted and described herein with respect to an embodiment in which control functions of exemplary network element 200 are provided by a central processing module (illustratively, the CPM 210) that is integrated with the exemplary network element 200, it is noted that in other embodiments at least a portion of the control functions of exemplary network element 200 may be external to (and even remote from) the other functions of exemplary network element 200.

In one embodiment, for example, MSMs 220 and IOMs 230 may be controlled by a controller that is disaggregated from the MSMs 220 and IOMs 230. In this embodiment, the controller may communicate with the MSMs 220 and IOMs 230 in any suitable manner (e.g., using a direct connection, using an indirect connection via one or more communications networks, and the like, as well as various combinations thereof). In this embodiment, the controller may include a processor, memory, an Input-output (I/O) module(s), and any other suitable module(s) and/or components (e.g., similar to those depicted and described with respect to CPM 210 of FIG. 2). In this embodiment, the I/O module(s) may be configured to support communication between the controller and exemplary network element. In this embodiment, the memory may store various programs and data configured for use by the processor in supporting various functions of the session bundle allocation capability as described herein. In one embodiment, for example, the memory may store one or more of a load balancing program and a session bundle allocation program (and/or any other program(s) suitable for use in providing the session bundle allocation capability). In this embodiment, the load balancing program and session bundle allocation program may be executed by the processor of the controller in order to externally control the operation of one or more of the MSMs 220 and the IOMs 230 to perform various operations (e.g., load balancing operations, session bundle allocation operations, and the like) and/or downloaded from the controller to exemplary network element 200 for use by one or more of the MSMs 220 and the IOMS 230 to perform various operations (e.g., load balancing operations, session bundle allocation operations, and the like).

In one embodiment, exemplary router network element is an Alcatel-Lucent 7750 service router, although, as described herein, the session bundle allocation capability may be implemented within any other suitable network element.

As described herein, exemplary network element 200 of FIG. 2 is configured to provide various functions of the session bundle allocation capability.

In one embodiment, for allocation of session bundles among the plurality of processing modules within a service router (e.g., a mobile gateway service router that is implementing an SGW or PGW), the bundle identifiers (bundle IDs) associated with the bundles of sessions are used to logically allocate the Tunnel Endpoint Identifiers (TEIDs) by the plurality of the processing modules on the groups of MSMs 220 of exemplary network element 200).

In one embodiment, on a mobile gateway, each MSM is assigned to an MSM Group identified by an MSM Group identifier. In one such embodiment, for example, an MSM Group could be: (a) 2 MSMs (e.g., the MSMs are fully redundant—active and standby MSMs), (b) 2 MSMs (e.g., both of the MSMs are active and backing up each other and running at 50% utilization), or (c) a single MSM (no redundancy). It will be appreciated that MSM Groups may be implemented in other ways (e.g., using different numbers of MSMs, using the MSMs of an MSM Group in for other types of redundancy and/or load-sharing purposes, and the like, as well as various combinations thereof).

In one embodiment, the UEs (e.g., on an SGW) and the Internet Protocol Connectivity Access Network (IP CAN) sessions (e.g., on a PGW) are assigned to the MSMs 220 by SBAM 214 of CPM 210. In general, once a UE (e.g., on an SGW) or an IP CAN session (e.g., on a PGW) is assigned to an MSM 220/MSCP 224, all control traffic and data traffic related to that UE/IP CAN session will be forwarded to that associated MSM 220/MSCP 224. In one embodiment, upon receiving such control traffic and data traffic, the CPM 210 or IOM 230 receiving the traffic looks at an appropriate identifier (e.g., TEIDs, Generic Routing Encapsulation (GRE) Keys, or Session IDs) in order to forward the traffic to the appropriate MSM 220/MSCP 224.

In one embodiment, in order to facilitate this automatic forwarding of traffic to the appropriate MSM 220/MSCP 224, the values of the relevant identifier are grouped into bundles which may then be assigned to MSM Groups (e.g., assigning bundles of UEs to MSM Groups, assigning bundles of GRE Keys to MSM Groups and/or assigning bundles of IP CAN sessions to MSM Groups). In one embodiment, the bundle sizes are kept relatively small in order to quickly move the bearers and sessions for a set of UEs at a time.

In one embodiment, the grouping of the values of an identifier into bundles is performed using ranges of values of the identifier (e.g., ranges of TEIDs, ranges of GRE Keys, and/or ranges of IP CAN sessions). In one embodiment (as primarily depicted and described herein for purposes of clarity), each bundle includes only a single range of values of the associated identifier (e.g., a single range of TEIDs, a single range of GRE Keys, or a single range of IP CAN sessions). In one embodiment (omitted for purposes of clarity), multiple ranges of values may be associated to form a single bundle.

Figure 3:
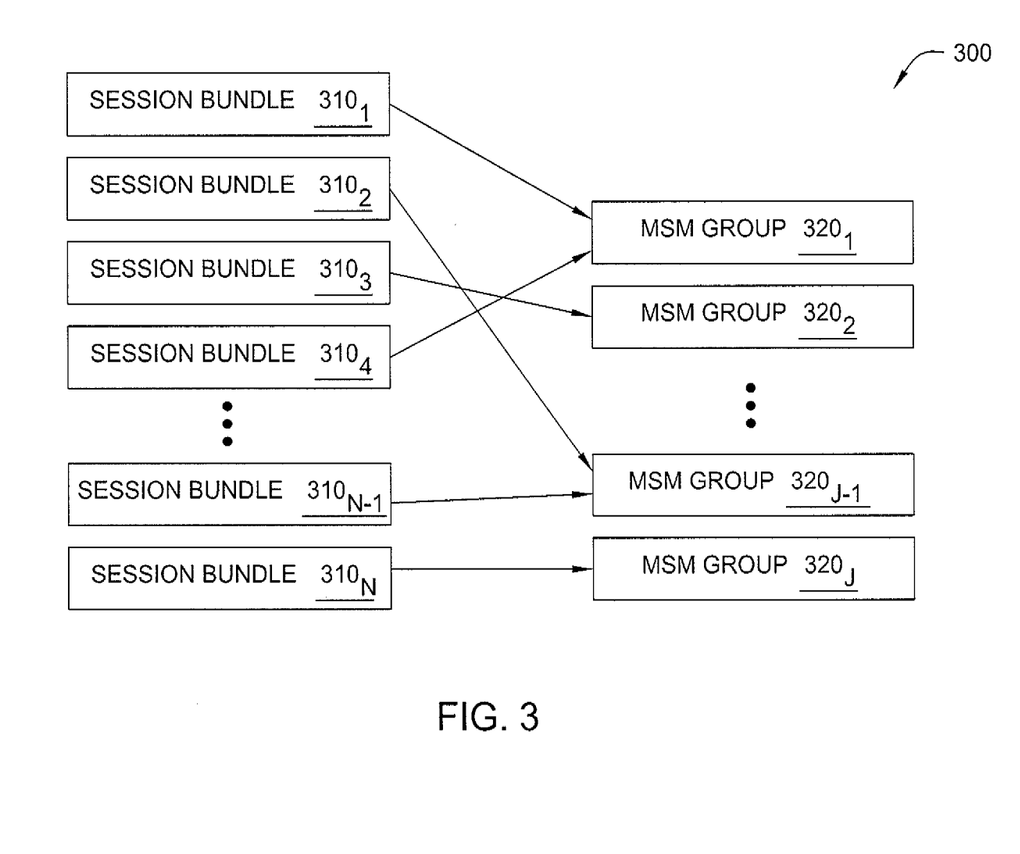
FIG. 3 depicts an exemplary assignment of a plurality of session bundles being supported by the exemplary router of FIG. 2 to a plurality of MSM groups of the exemplary router of FIG. 2.

An exemplary mapping of session bundles to MSM Groups is depicted and described with respect to FIG. 3.

FIG. 3 depicts an exemplary assignment of a plurality of session bundles being supported by the exemplary router of FIG. 2 to a plurality of MSM groups of the exemplary router of FIG. 2.

As depicted in FIG. 3, exemplary network element 200 supports a plurality of session bundles $310_1$-$310_N$ (collectively, session bundles 310) and includes a plurality of MSM Groups $320_1$-$320_J$ (collectively, MSM Groups 320). The session bundles 310 are assigned to MSM Groups 320 using a plurality of assignment 315.

In one embodiment, each session bundle 310 is assigned to only one MSM Group 320, and each MSM Group 320 may have one or more of the session bundles 310 assigned thereto. The assignments 315 of FIG. 3 are depicted according to this embodiment. Namely, in FIG. 3, session bundle $310_1$ is assigned to MSM Group $320_1$, session bundle $310_2$ is assigned to MSM Group $324_{J-1}$, session bundle $310_3$ is assigned to MSM Group $320_2$, session bundle $310_4$ is assigned to MSM Group $320_1$, session bundle $310_{N-1}$ is assigned to MSM Group $324_1$, and session bundle $310_N$ is assigned to MSM Group $320_J$. It will be appreciated that other embodiments are contemplated (e.g., assignment of one session bundle 310 to multiple MSM Groups 320, assignment of no session bundles to an MSM Group 320, and the like, as well as various combinations thereof).

As described above, FIG. 3 depicts an exemplary embodiment of a network element, for illustrating assignment of session bundles to groups of processing modules, where the network element is a mobile gateway, the processing modules of the network element are MSMs, and the sessions are types of sessions typically supported by a mobile gateway. As described herein, however, the session bundle allocation capability may be utilized in various other types of network elements. Accordingly, FIG. 3 may be considered to be an exemplary embodiment of a more general embodiment in which, in a network element having a plurality of processing modules and supporting a plurality of sessions, the processing modules of the network element are arranged to form a plurality of groups of processing modules (also referred to herein as processing module groups), the sessions being supported by the network element are bundled to form a plurality of bundles of sessions (also referred to as session bundles), and each session bundle is then assigned to one of the plurality of processing module groups.

Returning now to FIG. 2, the operation of the exemplary network element 200 of FIG. 2 in establishing and using the assignments 315 of FIG. 3 will now be described.

The SBAM 214 on CPM 210 assigns a bundle to an MSM Group upon request. The SBAM 214 tracks the assignment of bundles to MSM Groups (e.g., using one or more tables or other suitable data structures), such that the CPM 210 may then use the bundle-to-MSM-Group assignment information for appropriate forwarding of traffic to MSMs 220. The SBAM 214 downloads the bundle-to-MSM-Group assignment information to IOMs 230 for storage in IBLTs 234, respectively, such that the IOMs 230 may then use the bundle-to-MSM-Group assignment information for appropriate forwarding of traffic to MSMs 220.

In one embodiment, each BMCM 225 on each MSCP 224/MSM 220 is assigned one or more session bundles 310 by the SBAM 214 on the CPM 210 (e.g., when the MSCP 2241 MSM 220 is configured and becomes active, or at any other suitable time). In one embodiment, unused (or completely free) session bundles 310 are not returned to the SBAM 214 of the CPM 210 by the BMCM 225 of the MSCP 2241 MSM 220, except when an MSCP 2241 MSM 220 pair is de-configured or the mobile gateway is shutdown. This is done because the TEIDs assigned from the session bundles can be reused.

In general, UE IDs of users attaching through exemplary network element 200 may be assigned in any suitable manner. In one embodiment, for example, the SBAM 214 of CPM 210 allocates the UE IDs per user that attaches through the node. In one embodiment, for example, the BMCM 225 on the MSCP 224 may manage the bundle locally on the MSCP 224 and allocate unique UE IDs upon request.

In one embodiment, PDN Session IDs (PSIDs) are used by the requestor to generate the TEIDs, GRE Keys, and Session IDs for the IP CAN sessions. In other words, the PSID acts as the root for all other IDs generated and used. In one embodiment, for example, when a new IP CAN session is created for a new UE on an MSCP 224/MSM 220, a new PSID is allocated.

An understanding of the allocation scheme which may be used by SBAM 214 is informed by an understanding of how to divide the TEID/GRE Key/Session ID space.

Identifier Layouts:

In general, TEIDs, GRE Keys, and Session IDs (e.g., exchanged w/ a PCRF) are all 32-bit numbers. It will be appreciated that, even though following/debugging of assignments is simplified where each of these values (e.g., TEIDs, GRE Keys, and Session IDs) assigned to an IP CAN session is in some way derived from the same PSID, or otherwise related in some manner, this is not a requirement.

In one embodiment, the UEID is allocated from a bundle and the PSID is derived from the UEID by setting the S bits to different values resulting in a max of eight sessions as follows:

| BBBBBBBB | BBBBUUUU | UUUUUUUS | SSDI | XXXX |
|---|---|---|---|---|

In this exemplary layout of the 32-bit UEID and PSID, the 12 bits of B identify a Bundle ID, the 11 Bits of U identify a UE, the 3 bits of S identify the IP CAN session (unused by S11/S1-U TEIDs) per UEID, the D bit indicates whether the flow is upstream or downstream, the I bit indicates whether the TEID is used for an indirect tunnel, and the 4 bits of X are used to identify the bearers within the corresponding IP CAN session (they may be set to all-zeros (or some fixed random values) when it comes to GRE Keys and Session IDs exchanged with a PCRF).

In one embodiment, each MSM 220 belongs to an MSM group that is identified by an MSM Group ID. An MSM Group may include a single MSM 220, multiple MSMs 220, and the like. In general, each MSM 220 is assigned a plurality of IP CAN sessions, where the MSM 220 is used to handle IP CAN sessions having a particular IP CAN Session ID within a particular range of Session IDs (also referred to herein as a bundle of Session IDs).

As discussed hereinabove, the existing solution is that the specific MSM Group supporting a session is hardcoded into the first few bits of the Session IDs. Disadvantageously, however, such hardcoding prevents relocation of sessions from an initial MSM to one or more subsequent MSMs. In one embodiment of the session bundle allocation capability, by contrast, the UEID is allocated from a bundle and the PSID is derived from the UEID by setting the S bits to different values (e.g., resulting in a max of 8 sessions).

In one embodiment, the CPM 210 retains, for each session, mapping information that defines the specific MSM 220 (as well as the specific core 222 on the MSM 220) that will be used to process packets associated with a particular TEID.

In general, each TEID includes a plurality of bits arranged as a plurality of fields.

A first field is used to define the particular MSM 220 or IOM 230 that will be used to process the packet or forward the packet toward its ultimate destination. This field operates to effectively combine multiple sessions to provide a bundle of sessions 310, where each bundle of sessions 310 is processed by the same MSM 220. In one embodiment, a single MSM 220 processes sessions from only one bundle of sessions 310. In other embodiments, a single MSM 220 may process sessions of more than one bundle of sessions 310. By adapting the mapping between bundles of sessions 310 and the MSMs 220, the loading of a particular MSM 220 may be correspondingly adapted. The mechanism of assigning sessions to bundles of sessions 310 and assigning bundles of sessions 310 to an MSM group 320 enables virtual allocation of sessions to MSMs 220 such that load balancing, session migration, hot swapping of MSM hardware, redundancy/backup of MSM session, geo-redundancy and other goals may be achieved.

A second field is used to define the particular core 222 within the MSM 220 that will be used to process the packet. A core 222 may comprise a specific or unique one of a plurality of hardware/processing elements included within the MSM 220 or portions of the MSM 220. A core 222 may also comprise a virtual core, such as software defined virtual space having a processor cycle time allocation. The mechanism of assigning cores 222 (or instances of core 222) to specific sessions within a bundle of sessions 310 processed by an MSM 220 enables virtual allocation of sessions to cores 222 of MSMs 220, thereby enabling a load balancing within the cores 222 of MSMs 220. This further facilitates redundancy and QoS sustainability.

In one embodiment, the UEID and PSID are allocated from the "same" bundle ID (meaning the B bits are same). The U bits and the S Bits are not dependent on each other. On an SGW, the UEID is allocated only once, whereas the PSID is allocated up to a max of 11 times (because only 11 bearers are possible for a given UE).

In one such embodiment, the layout of the 32-bit UEID is as follows:

| BBBBBBBB | BBBBUUUU | UUUUUUUU | YYDI | XXXX |
|---|---|---|---|---|

In this exemplary layout of the 32-bit UEID, the 12 bits of B identify a Bundle ID, and the 12 bits of U identify a UE. In one embodiment, the 2 Y bits are each set to 0, the 1 D bit indicates whether the flow is upstream or downstream, the 1 I bit indicates whether the TEID is used for an indirect tunnel, and the 4 X bits are used to identify bearers within the IP CAN session. In one embodiment, this is used to derive the S11 control TEID per UE.

In one such embodiment, the layout of the 32-bit PSID is as follows:

| BBBBBBBB | BBBBSSSS | SSSSSSSS | SSDI | XXXX |
|---|---|---|---|---|

In this exemplary layout of the 32-bit PSID, the 12 bits of B identify a Bundle ID, the 14 Bits of S identify an IP CAN session, the 4 bits of X are used to identify the bearers associated with an UE or IP CAN session (e.g., they are set to all-zeros (or some fixed random value) when it comes to GRE Keys and Session IDs exchanged with a PCRF), the D bit indicates whether the flow is upstream or downstream, and the I bit indicates whether the TEID is used for an indirect tunnel.

In one embodiment, the layout of the TEID on the S11-C is as follows:

| BBBBBBBB | BBBBUUUU | UUUUUUUU | YYDI | XXXX |
|---|---|---|---|---|

In this exemplary layout of the TEID on the S11-C, the 12 B bits identify a bundle identifier of the bundle of sessions, and the 12 U bits identify the UE. In one embodiment, the 2 Y bits each are set to 0, the 1 D bit is set to 1 (to indicate an uplink direction), the 1 I bit is set to 0, and the 4 X bits each are set to 0.

In one embodiment, the layout of the TEID on the S5/S8 interface is as follows:

| BBBBBBBB | BBBBSSSS | SSSSSSSS | SSD0 | XXXX |
|---|---|---|---|---|

In this exemplary layout of the TEID on the S5/S8 interface, the 12 B bits identify a bundle identifier of the bundle of sessions, the 14 S bits identify the IP CAN session, the 1 D bit is set to 0 for a Serving Gateway (SGW) and is set to 1 for a Packet Data Network (PDN) Gateway (PGW), the 1 I bit is set to 0, and the 4 X bits are used to identify bearers within the IP CAN session. In this exemplary layout, the S bits are unique per session (which helps to distinguish the various IP CAN Sessions), and the X bits are used to distinguish the various bearers associated with the IP CAN sessions (e.g., for the S5/S8 control TEID the X bits are set to 0). In one embodiment, the layout of the GRE Key on the S5/S8 interface is as follows:

| BBBBBBBB | BBBBSSSS | SSSSSSSS | SSDI | XXXX |
|---|---|---|---|---|

In this exemplary layout of the GRE Key on the S5/S8 interface, the 12 B bits identify a bundle identifier of the bundle of sessions, the 14 S bits are unique per session for enabling differentiation between Access Point Names (APNs), the 1 D bit is set to 0 for an SGW and is set to 1 for a PGW, the 1 I bit is set to 0, and the 4 X bits are set to 0.

In one embodiment, the layout of the Session ID used internally or exchanged with a PCRF is as follows:

| BBBBBBBB | BBBBSSSS | SSSSSSSS | SSDI | XXXX |
|---|---|---|---|---|

In this exemplary layout of the Session ID used internally or exchanged with a PCRF, the 12 B bits identify a bundle identifier of the bundle of sessions, the 14 S bits are unique per session for enabling differentiation between Access Point Names (APNs), the 1 D bit is set to 0 for an SGW and is set to 1 for a PGW, the 1 I bit is set to 0, and the 4 X bits are set to 0.

In the foregoing examples, various unused bits in the GRE Key, TEIDs, PCRF session IDs are set to zero to make it easy to identify them at a quick glance.

The bundle ID is identified by the first 12 bits, resulting in 4000 bundles on a node. This is allocated by the SBAM 214 on the CPM 210. The UE is identified by the UEID, which is 26 bits long.

The UEID may be assigned by the SBAM 214 on the CPM 210. The PSID may be assigned by the BMCM 225 on the MSCP 224 of the associated MSM 220.

The UEID identifies a UE. In one embodiment, on an SGW, all the IP CAN Sessions of the UE are assigned to the same MSM 220/MSCP 224. In one embodiment, on a PGW, a decision may be made to go to a different MSM group 320 per IP CAN Session (e.g., perhaps for policy reasons or other reasons). This should not cause any problems, because these allocations are independent (meaning different BMCMs 225 on different MSCPs 224). If a decision is made to assign IP CAN sessions (of the same UE and APN, but different PDN type) to the same MSM group 320 for policy reasons on a PGW, an attempt may be made to relocate those IP CAN sessions (belonging to the same UE but having a different PSID) to the same MSM group 320 (e.g., for the same policy reasons).

This scheme allows support for up to $2^{26}$ (i.e., 64 million) UEs.

Various combinations such embodiments described above may be used at any suitable granularity (e.g., per portion of a network element, per network element, per portion of a network, and the like).

A description of various types of lookups, which may be used within the context of various embodiments of the session bundle allocation capability, follows.

Forwarding Plane:

As described herein, each of the IOMs 230 includes an IBLT 234. In one embodiment, each IBLT 234 includes $2^{12}$ entries, where each entry is 4 bits wide and gives the MSM Group ID of the MSM 220 to which traffic needs to be forwarded. In one embodiment, each IBLT 234 entry is indexed by the first 12 bits (MSB) of the PSID. In one such embodiment, a single byte holds two records as follows:

| MSM Group ID<br>(4 bits)<br>(Entry# 2n − 1) | MSM Group ID<br>(4 bits)<br>(Entry# 2n) |
|---|---|

In one embodiment, on each IOM 230, the IOM Control Module 232 of the IOM 230 uses the Bundle ID portion of the TEID or the GRE Key in the data packet to determine the MSM 220 which will perform the mobile related processing on the data packet. This may be determined, for example, using a lookup in the IBLT 234.

CPM:

As described herein, similar to each of the IOMs 230, the CPM 210 includes an MBLT 226 including $2^{12}$ entries, where each entry is 4 bits wide and gives the MSM Group ID of the MSM 220 to which traffic needs to be forwarded. In one embodiment, the MBLT 236 is indexed by the first 12 bits (MSB) of the PSID. In one such embodiment, a single byte holds two records as follows:

| MSM Group ID<br>(4 bits)<br>(Entry# 2n − 1) | MSM Group ID<br>(4 bits)<br>(Entry# 2n) |
|---|---|

In general, the control traffic that arrives at the CPM 210 needs to be examined and forwarded to the MSCPs 224 on the corresponding MSMs 220 on which the control traffic will be further processed. In one embodiment, the CPM 210 examines packets arriving for known sessions by extracting the relevant indicator (e.g., TEID, Session ID, IMSI, and the like) in the packet that allows the CPM 210 to do lookups on the packets and assign/redirect the packets to the MSCPs 224 of the appropriate MSMs 210.

GTP Control Packets:

In one embodiment, on an IOM 230 configured to operate as an ingress point to exemplary network element 200, when a packet with a non-zero TEID value is received, the IOM 230 uses the bundle bits (12 MSB bits) of the TEID to index into the IBLT 234 to determine the corresponding MSM 220 to which to direct the packet. In one embodiment, on an IOM 230 configured to operate as an ingress point to exemplary network element 200, when a packet with a TEID value of zero is received (e.g., indicating an initial connection request from a UE), the LB module 212 on CPM 210 performs load-balancing operation whereby the packet is assigned to an MSM 220/MSCP 224 which, thereby, automatically determines the MSM group (e.g., where the Bundle ID is assigned to the BMCM 225 on the MSCP 224 and is conveyed to the MSCP 224 from the CPM 210 to be populated in the local UE/Session database).

PCRF Packets:

In general, the Session ID in a PCRF packet identifies the IP CAN session. In one embodiment, the Bundle ID, which is the 12 MSB bits of the Session ID, is used to index into a bundle lookup table (e.g., the IBLT 234 on the IOM 230 on which the PCRF packet is received) to determine the MSM Group 320 for the PCRF packet.

PMIP Packets:

In one embodiment, for a PMIP packet, a IMSI value in the packet is used as an index into a local UE/Session database in order to identify the MSM Group 320 which will process the PMIP packet (and possibly to identify the Bundle ID of the bundle of sessions 310, if necessary or desired).

MSCP:

As described herein, each MSM 220 includes an MBLT 226. In one embodiment, each MBLT 226 includes 2^12 entries, where each entry is 16 bits wide. In one such embodiment, the first 5 bits specify the Task Index (identifying one of the 16 possible tasks) that owns the bundle of sessions 310, and the remaining 11 bits provide an index (or an offset) into the location where the bundle assignments for that task are available. In one embodiment, a combination of the task index and the offset/index into the task bundle table provides the start of the structure as shown below.

| Task Index | Offset/Index Into Task Bundle Table |
|---|---|
| 5-bits | 11 bits |

In one embodiment, the structure includes information about the UEIDs/PSIDs in the associated bundle. In one such embodiment, the structure includes a second table or array that is indexed by 14 bits. Bits 13 through 24 of the UEID or bits 13 through 26 of the PSID provide indicators of the UE record I Session record, respectively.

It is noted that various other types of lookups may be supported within the context of the session bundle allocation capability.

In one embodiment, for each new session created for a new UEID on an MSM, a new PDN session ID (PSID) is allocated.

In one embodiment, each of the UEID and the PSID are allocated to a common bundle (e.g., a common MSM or MSM processing element). In one embodiment, each BMCM 225 on each MSCP 224 of each MSM 220 manages the allocation of PSIDs within each bundle of sessions 310 and, similarly, the SBAM 214 on CPM 210 manages the allocation of bundles of sessions 310 to the MSMs 220 and the tasks to the MSMs 220. As a result, all of the sessions associated with a common bundle of sessions may be moved/migrated from one MSM 220 to another MSM 220 by changing the mappings, associated with the bundle of sessions, within the SBAM 214. In this manner, a rapid transition of sessions from one MSM 220 to another MSM 220 is provided. By contrast, due to the use of hard coding in existing arrangements (e.g., hard-coding of MSM identification in a TEID) of existing arrangements, the existing arrangements require the individual movement/migration of each of the sessions from one MSM to another MSM. In other words, the session bundle allocation capability, by obviating a need to hard code TEIDs to specific MSMs, avoids a situation in which, when one of the MSMs fails, all of the sessions hard coded to that failed MSMs are impacted, which would lead to significant degradation of user experience because the time required to change the hard coding of the session bundles is significant.

In one embodiment, an Alcatel-Lucent 7750 service router (e.g., 7750 SR-12 service router) implementing a mobile gateway includes, illustratively, two input-output modules (IOMs), two central processing modules (CPMs), and eight mobile services modules (MSMs). The CPM module and its operatives allocate session bundles across the individual MSMs and individual processing elements on the MSMs. In one embodiment, session bundles are allocated to an individual MSM. In one embodiment, session bundles are allocated to specific processing elements within an individual MSM.

Figure 4:
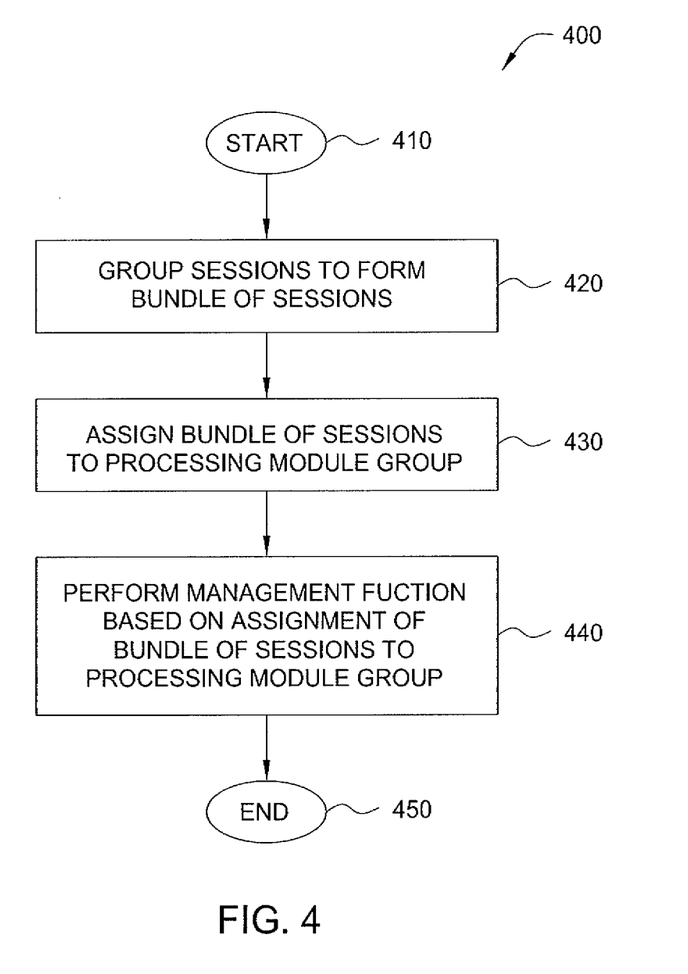
FIG. 4 depicts one embodiment of a method for assigning session bundles to processing module groups.

FIG. 4 depicts one embodiment of a method for assigning session bundles to processing module groups.

At step 410, method 400 begins.

At step 420, sessions are grouped to form a bundle of sessions. The bundle of sessions has a bundle identifier associated therewith.

At step 430, the bundle of sessions is assigned to one of a plurality of processing module groups.

At step 440, a management function is performed based on assignment of the bundle of sessions to one of a plurality of processing module groups.

In one embodiment, for example, the management function includes providing one or more identifiers using the bundle identifier of the bundle of sessions. For example, providing of one or more identifiers may include one or more of allocation of a user device identifier (e.g., UEID) for a user device in response to a session request of the user device, allocation of a session identifier (e.g., PSID) for a requested session of a user device using a user device identifier allocated for the user device, generation of a TEID for an IP CAN session using a session identifier, generation of a GRE Key, generation of a PCRF session identifier, deriving a TEID for an S11 control session using the user identifier, deriving a TEID for an S5/S8 control session using the session identifier, deriving a GRE Key for an S5/S8 control session using the session identifier, deriving a PCRF session identifier using the session identifier, and the like, as well as various combinations thereof. Various other embodiments for allocation and/or derivation of identifiers are provided herein.

In one embodiment, for example, the management function includes providing packet forwarding for packets based on assignment of the bundle of sessions to one of a plurality of processing module groups. For example, packet forwarding functions may include receiving a packet including an identifier, selecting one of the plurality of processing module groups based on the identifier, and forwarding the traffic toward a processing module of the selected one of the processing module groups.

In one embodiment, for example, the management function includes migrating the bundle of sessions between processing module groups. For example, where the processing module group to which the bundle of sessions is assigned is a first processing module group, the bundle of sessions may be migrated from the first processing module group to a second processing module group, in response to an event, by changing the bundle identifier from being associated with the first processing module group to being associated with the second processing module group.

It is noted that various other management functions may be performed based on assignment of the bundle of sessions to one of a plurality of processing module groups.

At step 450, method 400 ends.

Although primarily depicted and described herein with respect to embodiments in which allocation of session bundles to processing/switching elements in a router or other switching device is performed by a particular type of network element of a particular type of network (e.g., PGWs and SGWs of an LTE network or GGSNs of a 3G network), the allocation of session bundles among processing/switching elements may be utilized within various other types of network elements (e.g., other types of routers, switching devices, and the like) of various other types of networks.

It is noted that various embodiments of the session bundle allocation capability are especially useful within the context of load distribution, service upgrades, system redundancy, and the like. In general, embodiments of the session bundle allocation capability are useful within the context of any situation in which an individual MSM degrades or is taken off-line for some reason (e.g., plant upgrades and/or servicing, hot standby, geo-redundancy applications and the like). Various embodiments of the session bundle allocation capability are useful within other contexts and/or for other purposes.

Figure 5:
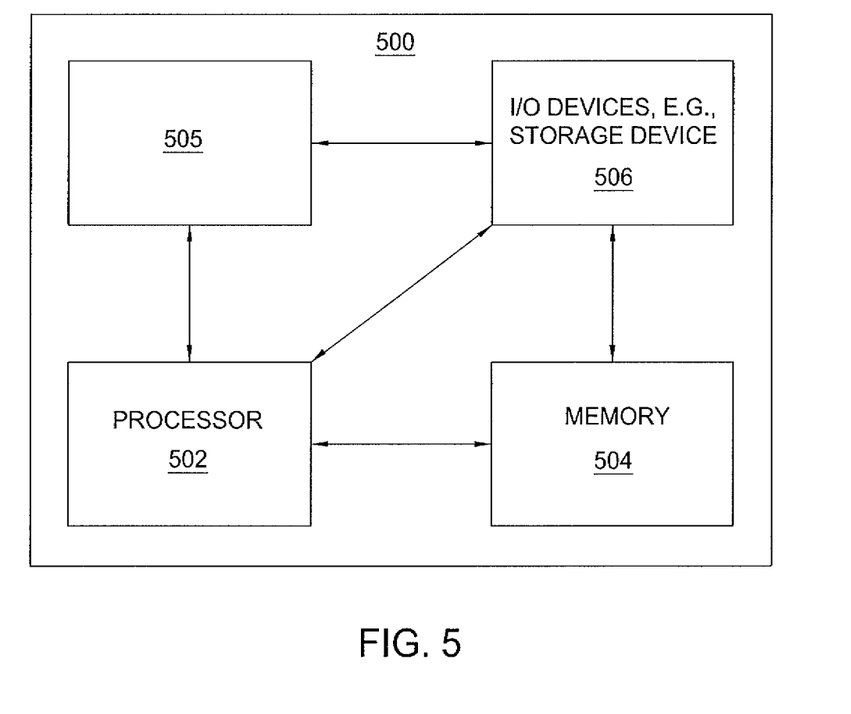
FIG. 5 depicts a high-level block diagram of a computer suitable for use in performing the functions described herein.

FIG. 5 depicts a high-level block diagram of a computer suitable for use in performing functions described herein.

As depicted in FIG. 5, computer 500 includes a processor element 502 (e.g., a central processing unit (CPU) and/or other suitable processor(s)) and a memory 504 (e.g., random access memory (RAM), read only memory (ROM), and the like)). The computer 500 also may include a cooperating module/process 505 and/or various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 505 can be loaded into memory 504 and executed by processor 502 to implement functions as discussed herein. Thus, cooperating process 505 (including associated data structures) can be stored on a computer readable storage medium, e.g., RAM memory, magnetic or optical drive or diskette, and the like.

It will be appreciated that computer 500 depicted in FIG. 5 provides a general architecture and functionality suitable for implementing functional elements described herein and/or portions of functional elements described herein. For example, the computer 500 provides a general architecture and functionality suitable for implementing one or more of exemplary network element 200, one or more elements of exemplary network element 200, and the like, as well as various combinations thereof.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
    a processor and a memory communicatively connected to the processor, the processor configured to:
        associate a plurality of sessions to form thereby a bundle of sessions, the bundle of sessions having a bundle identifier associated therewith;
        assign the bundle of sessions to a processing module group comprising one or more processing modules configured for processing communications traffic for the sessions of the bundle of sessions; and
        in response to a session request of a user device, allocate a user device identifier for the user device using the bundle identifier and allocate a session identifier for the requested session using the user device identifier.

2. The apparatus of claim 1, wherein the processing module group is one of a plurality of processing module groups, wherein the processor is configured to:
    receive a packet including an identifier;
    select one of the plurality of processing module groups based on the identifier; and
    forward the traffic toward a processing module of the selected one of the processing module groups.

3. The apparatus of claim 1, wherein the processing module group is a first processing module group, wherein the processor is configured to:
    in response to an event, migrate the bundle of sessions from the first processing module group to a second processing module group by changing the bundle identifier from being associated with the first processing module group to being associated with the second processing module group.

4. The apparatus of claim 1, wherein:
the user device is a User Equipment (UE) and the user device identifier is a UE Identifier (UEID) for the UE; and
the session identifier is a Packet Data Network (PDN) Session Identifier (PSID).

5. The apparatus of claim 4, wherein the PSID is associated with an Internet Protocol Connectivity Access Network (IP CAN) session.

6. The apparatus of claim 5, wherein the PSID is allocated in response to creation of an IP CAN session for the UE on one of the processing modules.

7. The apparatus of claim 5, wherein the processor is configured to:
generate, for the IP CAN session using the PSID associated with the IP CAN session, at least one of a Tunnel Endpoint Identifier (TEID), a Generic Routing Encapsulation (GRE) Key, and a Policy and Charging Rules Function (PCRF) session identifier.

8. The apparatus of claim 5, wherein the UEID is a 32-bit value, wherein the layout of the UEID comprises:
BBBBBBBB BBBBUUUU UUUUUUUS SSDIXXXX,
wherein:
the 12 B bits identify the bundle identifier of the bundle of sessions;
the 11 U bits identify the UE;
the 3 S bits identify the IP CAN session;
the 1 D bit indicates whether a flow is upstream or downstream;
the 1 I bit indicates whether a TEID is used for an indirect tunnel; and
the 4 X bits are used to identify bearers within the IP CAN session.

9. The apparatus of claim 8, wherein allocating the PSID using the UEID comprises setting the S bits.

10. The apparatus of claim 5, wherein the UEID is a 32-bit value, wherein the layout of the UEID comprises:
BBBBBBBB BBBBUUUU UUUUUUUU YYDIXXXX,
wherein:
the 12 B bits identify the bundle identifier of the bundle of sessions;
the 12 U bits identify the UE;
the 2 Y bits are each set to 0;
the 1 D bit indicates whether the flow is upstream or downstream;
the 1 I bit indicates whether a Tunnel Endpoint Identifier (TEID) is used for an indirect tunnel; and
the 4 X bits are used to identify bearers within the IP CAN session.

11. The apparatus of claim 10, wherein the processor is configured to:
derive TEID for an S11 control session using the UEID, wherein the TEID for the S11 control session is a 32-bit value, wherein the layout of the TEID value for the S11 control session comprises:
BBBBBBBB BBBBUUUU UUUUUUUU YYDIXXXX,
wherein:
the 12 B bits identify the bundle identifier of the bundle of sessions;
the 12 U bits identify the UE;
the 2 Y bits each are set to 0;
the 1 D bit is set to 1;
the 1 I bit is set to 0; and
the 4 X bits each are set to 0.

12. The apparatus of claim 5, wherein the PSID is a 32-bit value, wherein the layout of the PSID value comprises:
BBBBBBBB BBBBSSSS SSSSSSSS SSDIXXXX,
wherein:
the 12 B bits identify the bundle identifier of the bundle of sessions;
the 14 S bits identify the IP CAN session;
the 1 D bit indicates whether a flow is upstream or downstream;
the 1 I bit indicates whether a TEID is used for an indirect tunnel; and
the 4 X bits are used to identify bearers within the IP CAN session.

13. The apparatus of claim 12, wherein the processor is configured to:
derive a TEID for an S5/S8 control session using the PSID, wherein the TEID for the S5/S8 control session is a 32-bit value, wherein the layout of the TEID value for the S5/S8 control session comprises:
BBBBBBBB BBBBSSSS SSSSSSSS SSDIXXXX,
wherein:
the 12 B bits identify the bundle identifier of the bundle of sessions;
the 14 S bits identify the IP CAN session;
the 1 D bit is set to 0 for a Serving Gateway (SGW) and is set to 1 for a Packet Data Network (PDN) Gateway (PGW);
the 1 I bit is set to 0; and
the 4 X bits are used to identify bearers within the IP CAN session.

14. The apparatus of claim 13, wherein the TEID for the uplink, downlink and indirect tunnels of individual bearers is a 32-bit value, wherein the layout of the TEID value for each of the individual bearers comprises:
BBBBBBBB BBBBSSSS SSSSSSSS SSDIXXXX,
wherein:
the 12 B bits identify the bundle identifier of the bundle of sessions;
the 14 S bits identify the IP CAN session;
the 1 D bit is set to 0 for down link direction and 1 for uplink direction;
the 1 I bit is set to 0 for normal tunnels and 1 for indirect tunnels; and
the 4 X bits are used to identify bearers within the IP CAN session.

15. The apparatus of claim 12, wherein the processor is configured to:
derive a Generic Routing Encapsulation (GRE) Key for an S5/S8 control session using the PSID, wherein the GRE Key for the S5/S8 control session is a 32-bit value, wherein the layout of the GRE Key value for the S5/S8 control session comprises:
BBBBBBBB BBBBSSSS SSSSSSSS SSDIXXXX,
wherein:
the 12 B bits identify the bundle identifier of the bundle of sessions;
the 14 S bits are unique per session for enabling differentiation between Access Point Names (APNs);
the 1 D bit is set to 0 for a Serving Gateway (SGW) and is set to 1 for a Packet Data Network (PDN) Gateway (PGW);
the 1 I bit is set to 0; and
the 4 X bits are set to 0.

16. The apparatus of claim 12, wherein the processor is configured to:
derive a Policy and Charging Rules Function (PCRF) session identifier using the PSID, wherein the PCRF session identifier is configured for use for exchanging messages with a PCRF, wherein the PCRF session identifier is a 32-bit value, wherein the layout of the PCRF session identifier value comprises:

BBBBBBBB BBBBSSSS SSSSSSSS SSDIXXXX, wherein:

the 12 B bits identify the bundle identifier of the bundle of sessions;

the 14 S bits are unique per session for enabling differentiation between Access Point Names (APNs);

the 1 D bit is set to 0 for a Serving Gateway (SGW) and is set to 1 for a Packet Data Network (PDN) Gateway (PGW);

the 1 I bit is set to 0; and the 4 X bits are set to 0.

17. The apparatus of claim 1, wherein the processing module group is one of a plurality of processing module groups, wherein the processor is configured to:

receive a packet including an identifier, wherein the identifier comprises one of a Tunnel Endpoint Identifier (TEID), a Generic Routing Encapsulation (GRE) Key, and a Policy and Charging Rules Function (PCRF) session identifier;

select one of the plurality of processing module groups based on the identifier; and forward the packet toward a processing module of the selected one of the processing module groups.

18. A non-transitory computer-readable storage medium storing instructions which, when executed by a processor, cause the processor to perform a method comprising:

associating a plurality of sessions to form thereby a bundle of sessions, the bundle of sessions having a bundle identifier associated therewith;

assigning the bundle of sessions to a processing module group comprising one or more processing modules configured for processing communications traffic for the sessions of the bundle of sessions; and in response to a session request of a user device, allocating a user device identifier for the user device using the bundle identifier and allocating a session identifier for the requested session using the user device identifier.

19. A method, comprising:

using a processor and a memory for:

associating a plurality of sessions to form thereby a bundle of sessions, the bundle of sessions having a bundle identifier associated therewith;

assigning the bundle of sessions to a processing module group comprising one or more processing modules configured for processing communications traffic for the sessions of the bundle of sessions; and in response to a session request of a user device, allocating a user device identifier for the user device using the bundle identifier and allocating a session identifier for the requested session using the user device identifier.

20. An apparatus, comprising:

a processor and a memory communicatively connected to the processor, the processor configured to:

receive a packet associated with a session and including an identifier, wherein a portion of the identifier is a bundle identifier associated with a bundle of sessions, wherein the bundle of sessions includes the session of the received packet;

select one of a plurality of processing module groups based on a mapping of the bundle identifier to the selected one of the processing module groups, wherein the processing module group comprises one or more processing modules configured for processing the packet; and forward the packet toward a processing module of the selected one of the processing module groups.

21. The apparatus of claim 20, wherein the selected one of the processing module groups is a first processing module group, wherein the processor is configured to:

in response to an event, migrate the bundle of sessions from the first processing module group to a second processing module group by changing the bundle identifier from being associated with the first processing module group to being associated with the second processing module group.

22. The apparatus of claim 21, wherein the received packet is a first received packet associated with the session, wherein the processor is configured to:

receive a second packet associated with the session and including the identifier;

select the second processing module group based on the mapping of the bundle identifier to the second processing module group, wherein the second processing module group comprises one or more processing modules configured for processing the second packet; and forward the second packet toward a processing module of the second processing module group.

* * * * *